United States Patent
Chang et al.

(10) Patent No.: US 8,134,849 B2
(45) Date of Patent: Mar. 13, 2012

(54) AC TO DC POWER CONVERTER USING AN ENERGY-STORAGE CAPACITOR FOR PROVIDING HOLD-UP TIME FUNCTION

(75) Inventors: Shun-Te Chang, Taipei Hsien (TW); Wei-Liang Lin, Taipei Hsien (TW)

(73) Assignee: Acbel Polytech Inc., Taipei Hsien (TW)

( * ) Notice: Subject to any disclaimer, the term of this patent is extended or adjusted under 35 U.S.C. 154(b) by 421 days.

(21) Appl. No.: 12/403,258

(22) Filed: Mar. 12, 2009

(65) Prior Publication Data
US 2010/0014330 A1  Jan. 21, 2010

(30) Foreign Application Priority Data
Jul. 16, 2008 (TW) .............................. 97126895 A

(51) Int. Cl.
*H02M 7/217* (2006.01)
(52) U.S. Cl. ........................................................ 363/89
(58) Field of Classification Search .................. 323/207; 363/89
See application file for complete search history.

(56) References Cited

U.S. PATENT DOCUMENTS

| | | | | |
|---|---|---|---|---|
| 5,258,901 A | * | 11/1993 | Fraidlin | 363/15 |
| 5,726,845 A | * | 3/1998 | Ho | 361/86 |
| 5,886,885 A | * | 3/1999 | Fujie | 363/49 |
| 6,882,551 B2 | * | 4/2005 | Shimada et al. | 363/79 |
| 7,375,994 B2 | * | 5/2008 | Andreycak | 363/89 |
| 7,391,631 B2 | * | 6/2008 | Shimada | 363/89 |
| 7,505,291 B2 | * | 3/2009 | Wang et al. | 363/89 |
| 7,812,586 B2 | * | 10/2010 | Soldano et al. | 323/285 |
| 2008/0316779 A1 | * | 12/2008 | Jayaraman et al. | 363/74 |
| 2010/0014330 A1 | * | 1/2010 | Chang et al. | 363/89 |

* cited by examiner

*Primary Examiner* — Jeffrey Sterrett
(74) *Attorney, Agent, or Firm* — Apex Juris, pllc; Tracy M. Heims

(57) ABSTRACT

An AC to DC power converter with hold up time function has a charging switch and a mode switch. The charging switch is connected between an output capacitor of a PFC controlling circuit and an energy-storage capacitor. The mode switch is connected between the energy-storage capacitor and an input of the PFC controlling circuit. The charging and mode switches are controlled by a PFC controller. When AC power is normal, the charging switch turns on and mode switch turns off. Meanwhile, the energy-storage capacitor and the output capacitor are connected in parallel to store energy in the energy-storage capacitor. When the AC power source is interrupted, the charging switch turns off and mode switch turns on. Therefore, the energy-storage capacitor is disconnected from the output capacitor. The PFC circuit obtains power from the energy-storage capacitor and continuous to supply an output voltage for a while.

5 Claims, 6 Drawing Sheets

AC TO DC POWER CONVERTER USING AN ENERGY-STORAGE CAPACITOR FOR PROVIDING HOLD-UP TIME FUNCTION

BACKGROUND OF THE INVENTION

1. Field of the Invention

The invention relates to an AC to DC power converter, and more particularly to an AC to Dc power converter having hold-up time function.

2. Description of Related Art

With reference to FIG. 4, a conventional power converter for converting a high AC voltage to a low DC voltage is disclosed in U.S. Pat. No. 6,504,497. The power converter comprises a full wave rectifier (50), a power factor correcting (PFC) circuit (51) a switch type DC to DC converter (52), a capacitor (53) and a hold-up time extension circuit (54).

The full wave rectifier (50) receives an AC power with the peak voltage ±220×1.141≅±310V and converters the AC power to a sine DC power with the peak voltage +310V.

The PFC circuit (51) is connected to the full wave rectifier (50) to receive the sine DC power and regulates a voltage phase and a current phase of the sine DC power to be consistent with each other. The regulated DC power is further input to a voltage boost circuit for producing a high DC voltage (+380V).

The switch type DC to DC converter (52) is connected to the PFC circuit (51) to receive the high DC voltage. The switch type DC to DC converter (52) converts the high DC voltage to a required DC voltage with a relative low level such as +12V or +5V.

The PFC circuit (51) is constructed by a voltage boost circuit and generates a voltage with a higher level than the sine DC power output from the full wave rectifier (50). Since the power converter has to supply a low DC voltage, the switch type DC to DC converter (52) accordingly bucks the high DC voltage. For example, when the switch type DC to DC converter (52) is operated in the continuous conduction mode (CCM) to convert the high DC voltage of 380V to a relative low DC voltage of +12V or +5 V, an active switch of the switch type DC to DC converter (52) has the duty ratio $D=V_o/V_i$. According to the equation, the duty ratio of the active switch is small and the power conversion efficiency is low.

Furthermore, to ensure that the load can obtain an emergency operating voltage for safely shutting down once the AC power is suddenly interrupted, the power converter further includes the hold-up time extension circuit (54) and the capacitor (53). The capacitor (53) is coupled to an output capacitor (511) through the hold-up time extension circuit (54). When the voltage of the output capacitor (511) is lower than a threshold value, the capacitor (53) provides power for the hold-up time extension circuit (54). The hold-up time extension circuit (54) converts the power from the capacitor (53) to a DC voltage and further supplies the DC voltage to the switch type DC to DC converter (52) and sustains the voltage level on the output capacitor (511) to extend the hold-up time.

As described above, the conventional power converter has to add a hold-up time extension circuit having the boost circuit configuration to extend the hold-up time. Therefore, the power converter accordingly includes two voltage boosting circuits that respectively need a separate PWM controller (IC1)(IC2). As a result, the power conversion efficiency is low and the circuit design is complex and expensive.

To overcome the shortcomings, the present invention uses an AC to DC power converter with hold-up time function to mitigate or obviate the aforementioned problems.

SUMMARY OF THE INVENTION

The objective of the present invention is to an AC to DC power converter that can accomplishes hold-up time function with simple circuit configuration.

To achieve the objective, the AC to DC power converter has a full wave rectifier, a PFC circuit, a PFC controller, a switch type DC to DC converter, an energy-storage capacitor and a mode switch.

The full wave rectifier receives AC power and rectifies the AC power to sine DC power that is further input to the PFC circuit.

The PFC controller receives the sine DC power and adjusts a voltage phase and a current phase of the sine DC power to be consistent with each other.

The switch type DC to DC converter connects to an output capacitor of the PFC circuit, and bucks the DC voltage to product a low DC voltage.

The energy-storage capacitor is indirectly connected in parallel to the output capacitor through a charging switch.

The mode switch is connected between the energy-storage capacitor and the input terminal of the PFC circuit.

When the PFC controller determines that the AC power is normal, the charging switch is turned on and the mode switch is turned off to make the energy-storage capacitor connect to the output capacitor in parallel. Therefore, DC power can be stored in the energy-storage capacitor.

When the PFC controller determines that the AC power is interrupted, the charging switch is turned off and the mode switch is turned on to disconnect the energy-storage capacitor from the output capacitor. The energy-storage capacitor connects to the input terminal of the PFC circuit. The PFC circuit regulates the voltage of the energy-storage capacitors and produces a DC voltage at the output capacitor for a while.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
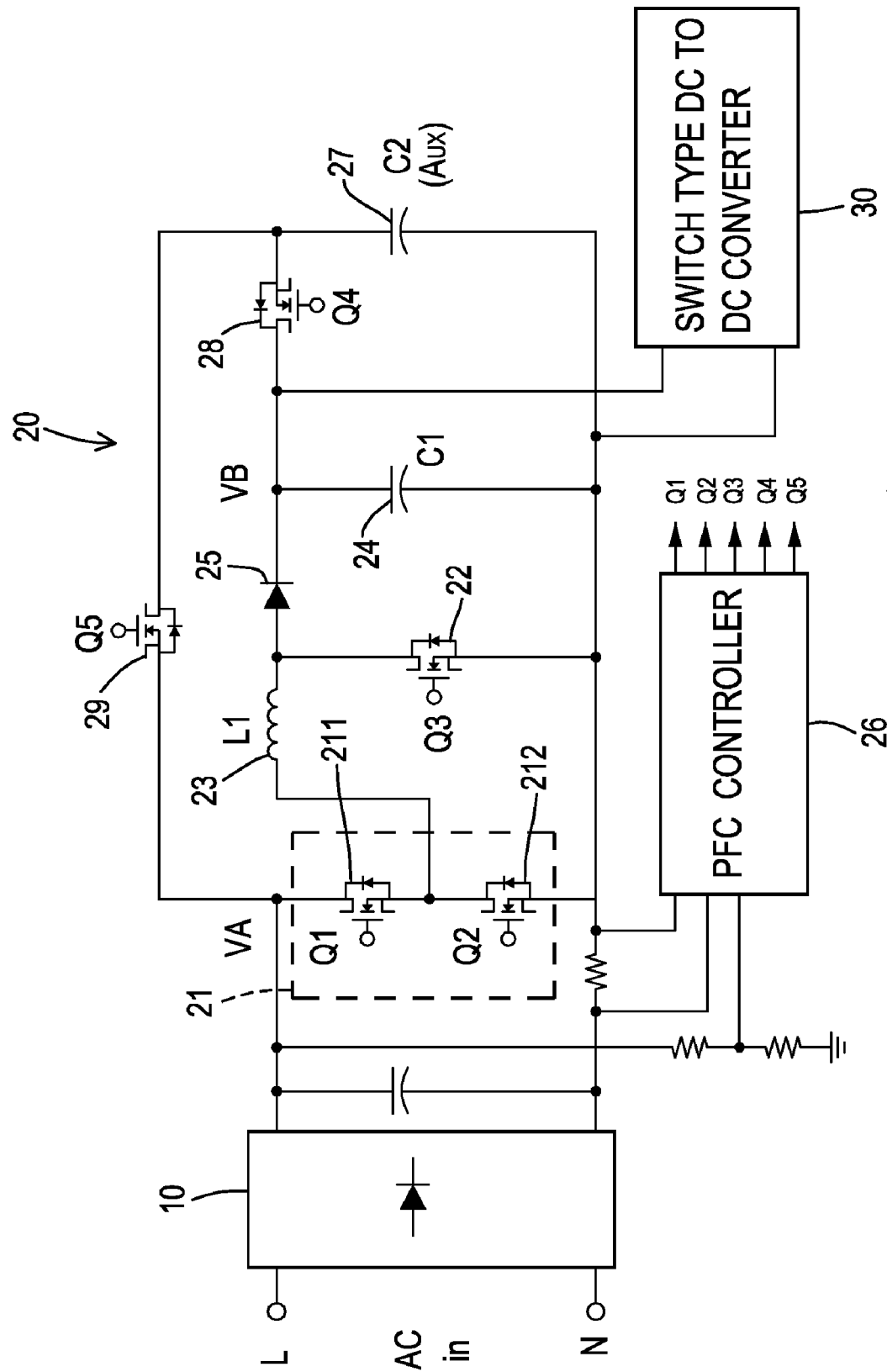
FIG. 1 is a circuit diagram of an AC to DC power converter in accordance with the present invention.

With reference to FIG. 1, an AC to DC power converter in accordance with the present invention comprises a full wave rectifier (10), a power factor correction (PFC) circuit (20), a PFC controller (26), a switch type DC to DC converter (30), an energy-storage capacitor (27) and a mode switch (29).

The full wave rectifier (10) receives sine AC power (220V) and rectifies the sine AC power to sine DC power (+310V).

The PFC circuit (20) is connected to the full wave rectifier (10) to receive the sine DC power and comprises an output capacitor (24).

The PFC controller (26) is connected to the full wave rectifier (10) and the PFC circuit (20) to sense a voltage signal and a current signal of the sine DC power for controlling the PFC circuit (20). Based on the voltage and current signals, the PFC circuit (20) adjusts the voltage phase and current phase of the sine DC power to be consistent with each other. The PFC controller (26) also controls the PFC circuit (20) to regulate the sine DC power for producing a stable DC voltage (VB) on the output capacitor (24).

The switch type DC to DC converter (30) is connected to the PFC circuit (20) to buck the DC voltage (VB) for producing a required low DC voltage, for example +12V or +5V. The switch type DC to DC converter (30) may be a buck converter, a boost converter, a flyback converter, a forward converter, a full bridge converter or a half bridge converter.

The energy-storage capacitor (27) is indirectly coupled to the output capacitor (24) through a charging switch (28). A control terminal of the charging switch (28) is connected to and controlled by the PFC controller (26).

The mode switch (29) is connected between the energy-storage capacitor (27) and the input terminal of the PFC circuit (20). A control terminal of the mode switch (29) is connected to and controlled by the PFC controller (26).

In the present invention, the energy-storage capacitor (27) is coupled to the output capacitor (24) and the input terminal of the PFC circuit (20) respectively through the charging switch (28) and the mode switch (29) that are controlled by the PFC controller (26). When the PFC controller (26) determines that the AC power is normal, the charging switch (28) is turned on and the mode switch (29) is turned off to make the energy-storage capacitor (27) connect to the output capacitor (24) in parallel. Therefore, DC power can be stored in the energy-storage capacitor (27). When the PFC controller (26) determines that the AC power is interrupted, the charging switch (28) is turned off and the mode switch (29) is turned on to disconnect the energy-storage capacitor (27) from the output capacitor (24). The energy-storage capacitor (27) is then connected to the input terminal of the PFC circuit (20). The PFC circuit (20) regulates the voltage of the energy-storage capacitors (27) and produces a DC voltage at the output capacitor (24).

With respect to the PFC circuit (20), it further comprises a switch unit (21), a third switch (22), an inductor (23) and a diode (25). The switch unit (21) is connected to the output terminals of the full wave rectifier (10) in parallel and composed of a first switch (211) and a second switch (212). The first switch (211) and the second switch (213) are connected in series and their control terminals are connected to the PFC controller (26). Moreover, the first switch (211) is indirectly connected to the energy-storage capacitor (27) through the mode switch (29).

The inductor (23) has a first terminal and a second terminal. The first terminal is connected to a node where the first switch (211) and the second switch (212) are connected in series.

The third switch (22) is connected between the second terminal of the inductor (23) and the ground. The second terminal of the inductor (23) and the third switch (22) are commonly connected to the output capacitor (24) through the diode (25). In other words, an anode of the diode (25) is connected to the inductor (23) and the third switch (22), and a cathode of the diode (25) is connected to the output capacitor (24). The control terminal of the third switch (22) is also connected to the PFC controller (26).

Because the inductor (23) is connected to the output terminals of the full wave rectifier (10) through the switch unit (21) with one terminal, and connected to the third switch (22) and the output capacitor (24) through the diode (25) with the other terminal, the PFC controller (26) controls the turn-on and turn-off operations of the switch unit (21) and the third switch (22) based on the voltage and current signals of the sine DC power to stabilize the DC voltage (VB) of the output capacitor (24). Further, since the switch unit (21) and the mode switch (29) are turned on under the control of the PFC controller (26) to form a complete loop when the AC power is interrupted, the stored energy in the energy-storage capacitor (27) is boosted and then supplied to the switch type DC to DC converter (30) via the output capacitor (24) to sustain the output DC voltage for a while.

With regard to the circuit operations of the PFC circuit (20), the PFC controller (26) includes a program and can be operated in a boost mode, a buck mode or a hold-up time extension mode under control of the program.

A. Boost Mode

Figure 2A:
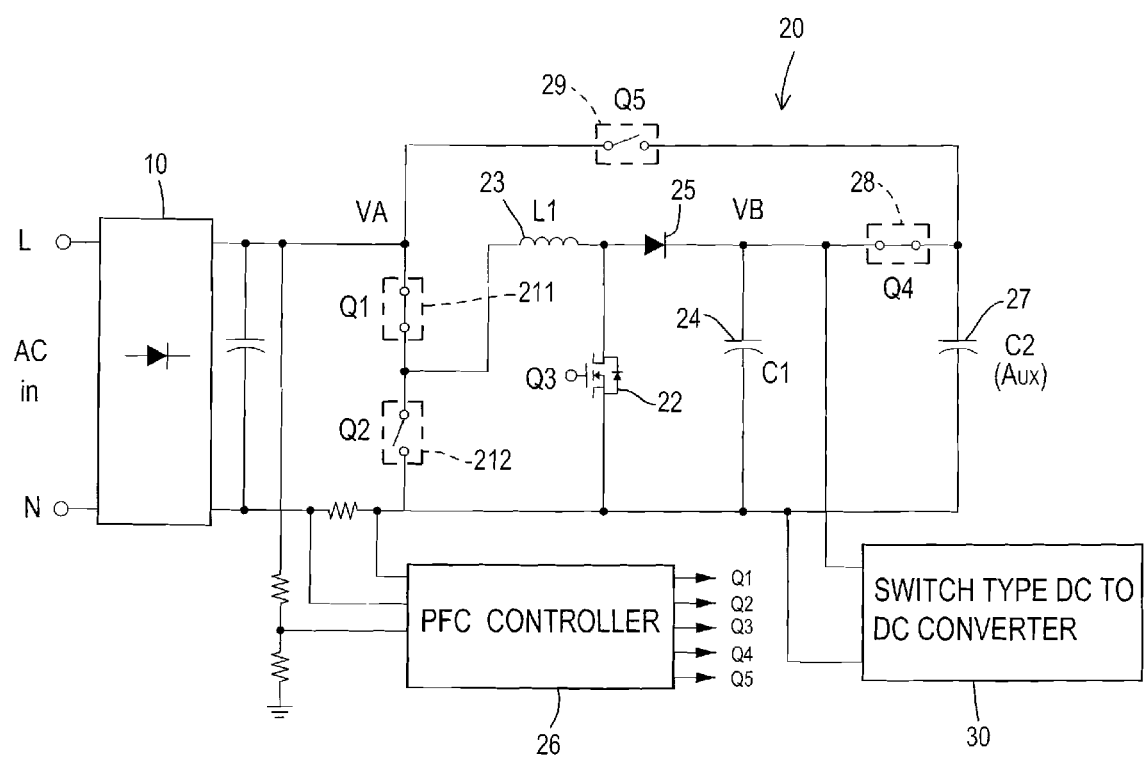
FIG. 2A is an operational circuit diagram of the AC to DC power converter in accordance with the present invention being operated in a boost mode.
Figure 3:
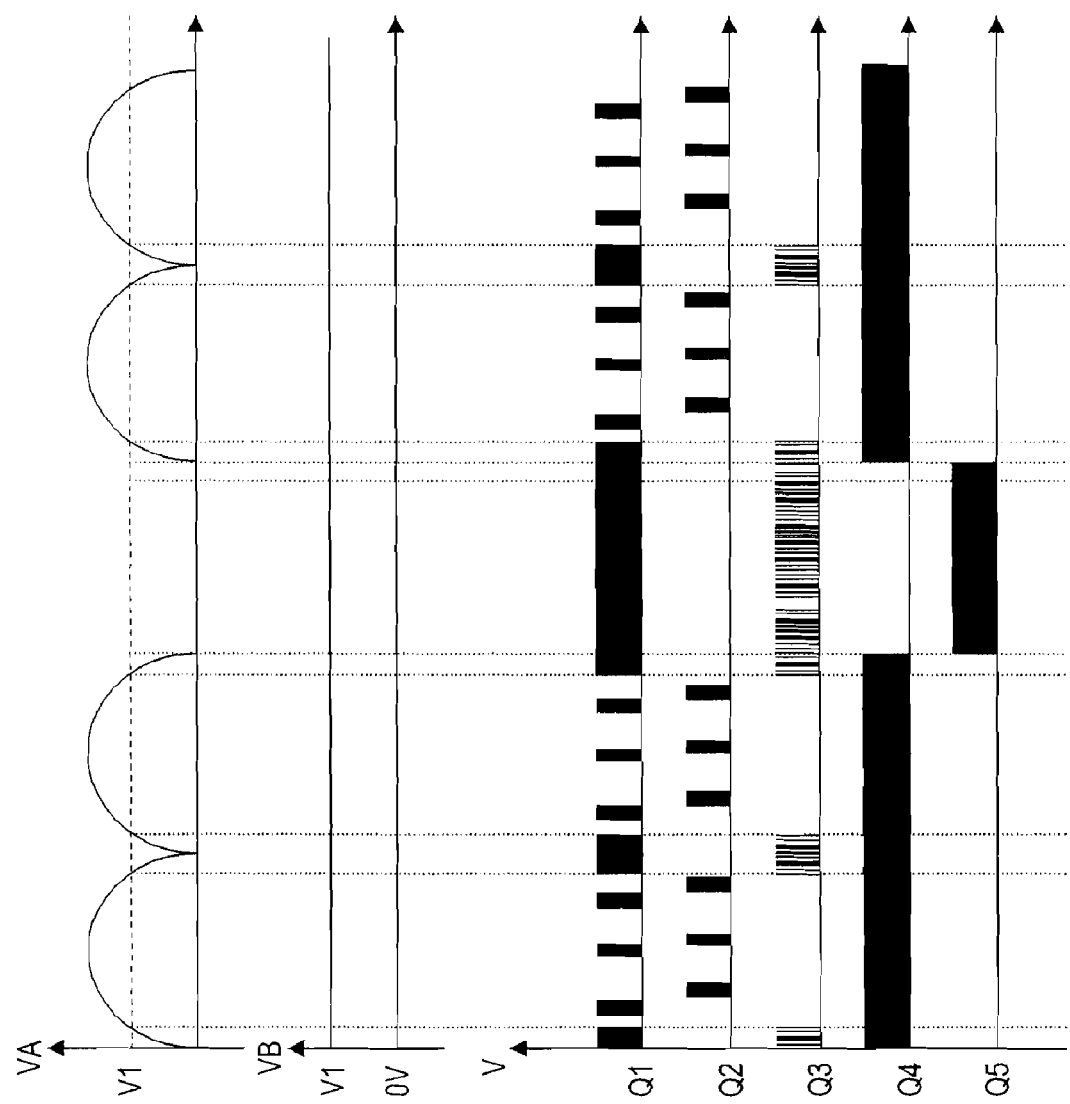
FIG. 3 shows waveforms of DC voltages and control signals of different switches in accordance with the present invention.
Figure 4:
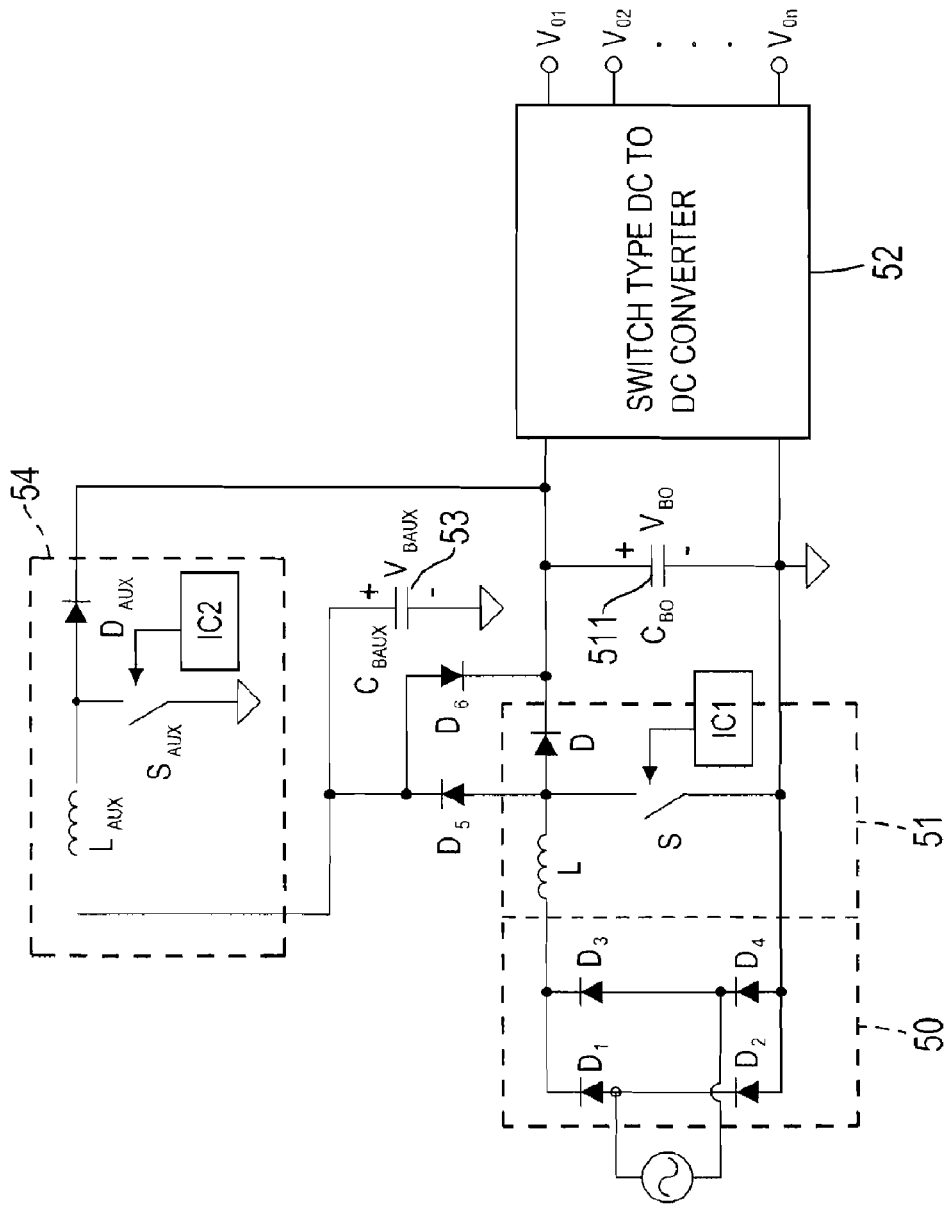
FIG. 4 is a circuit diagram of a conventional power converter.

With reference to FIGS. 2A and 3, because the voltage level of the sine DC power (VA) output from the full-wave rectifier (10) will vary, the PFC 8 controller (26) determines that whether the since DC power (VA) is lower than a threshold value ($V_1$, for example 200V). If the sine DC power (VA) is lower than the threshold value ($V_1$), the PFC controller (26) turns on the first switch (211) to store energy in the inductor (23) and turns off the second switch to separate the inductor (23) from the sine DC power (VA). Based on a difference between the sine DC power (VA) and the threshold value ($V_1$), the PFC controller (26) properly adjusts the duty cycle of the third switch (22). If the duty cycle of the third switch (22) is relative large, the current DC voltage can raise to the threshold value ($V_1$) quickly, as shown by the voltage waveform of the DC voltage (VB) on FIG. 3. To charge the energy-storage capacitor (27), the PFC controller (26) turns on the charging switch (28) to connect the energy-storage capacitor (27) to the output capacitor (24) in parallel. Because the AC power is normal, the hold-up time function does not have to be activated and discharging from the energy-storage capacitor (27) to the output capacitor (24) is unnecessary. Therefore, the mode switch (29) is turned off.

B. Buck Mode

Figure 2B:
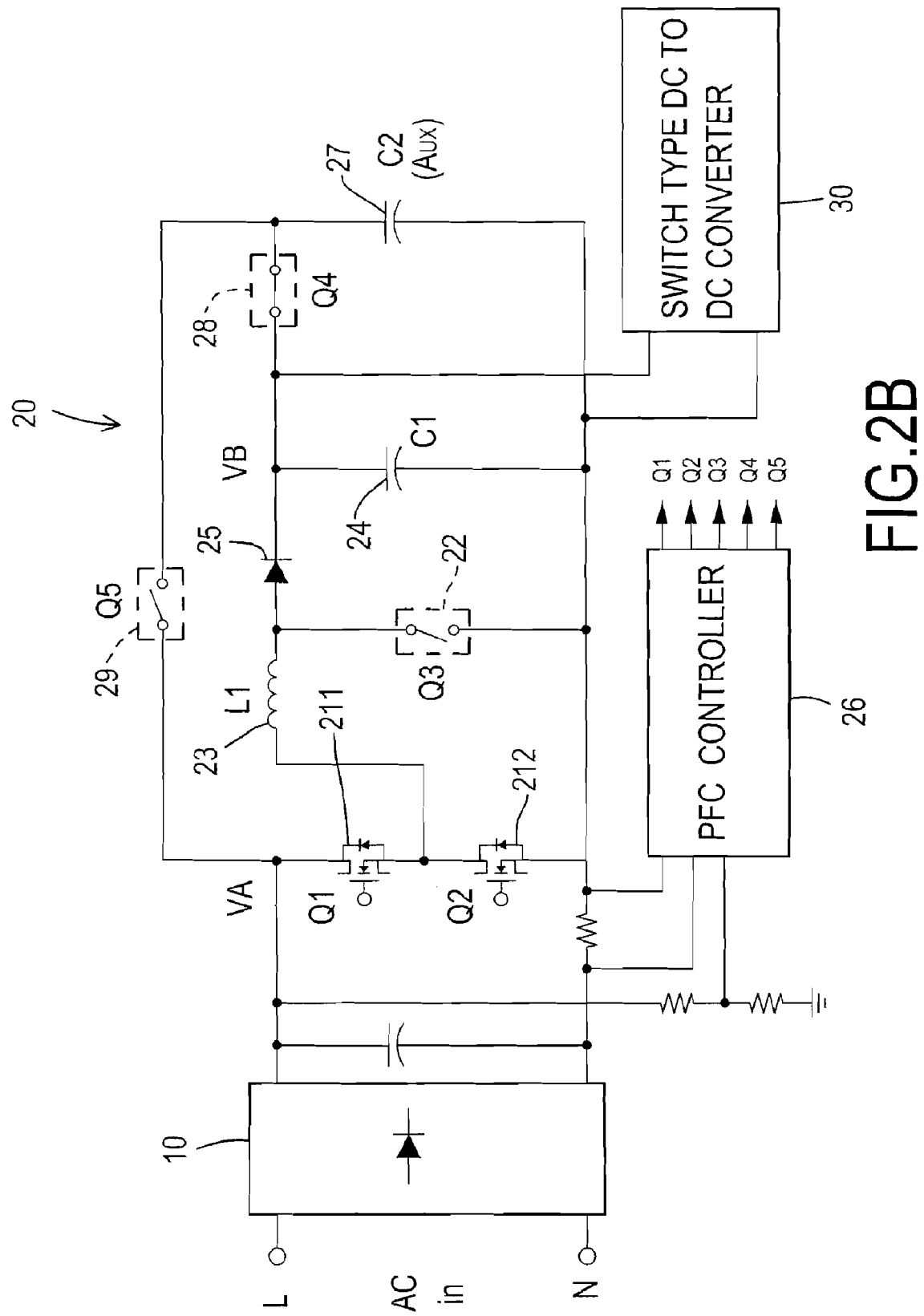
FIG. 2B is an operational circuit diagram of the AC to DC power converter in accordance with the present invention being operated in a buck mode.

With reference to FIG. 2B, when the sine DC power (VA) is higher than the threshold value ($V_1$), the PFC controller (26) turns off the third switch (22) and based on the difference of the sine DC power (VA) between threshold value ($V_1$) determines whether the first switch (211) and the second switch (212) should be alternately activated or all turned on to decrease the current since DC power (VA) and keep the DC voltage (VB) of the output capacitor (24) to be consistent with the threshold value ($V_1$). Therefore, the present invention can remain the DC voltage (VB) at the level of threshold value (V1). To charge the energy-storage capacitor (27), the charging switch (28) is turned on to connect the energy-storage capacitor (27) to the output capacitor (24) in parallel. Because the AC power is normal, the hold-up time function does not have to be activated and discharging from the energy-storage capacitor (27) to the output capacitor (24) is unnecessary. Therefore, the mode switch (29) is turned off.

C. Hold-Up Time Mode

Figure 2C:
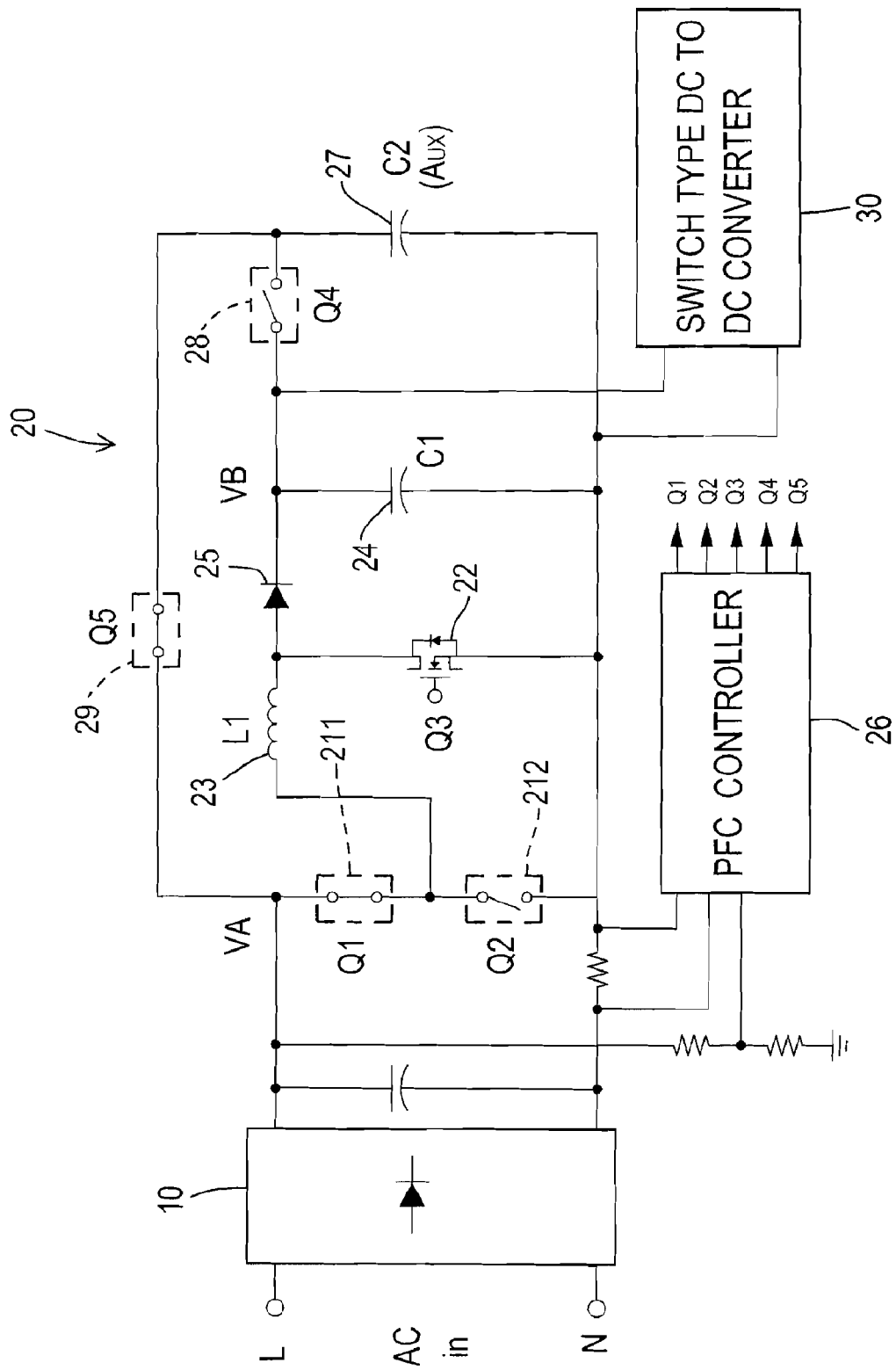
FIG. 2C is an operational circuit diagram of the AC to DC power converter in accordance with the present invention being operated in a hold-up time extension mode.

With reference to FIG. 2C, if the voltage level of the sine DC power is zero, the PFC controller (26) immediately turns off the second switch (212) and the charging switch (28), and turns on the first switch (211) and the mode switch (29). The energy stored in the energy-storage capacitor (27) is discharged to the inductor (23) through the mode switch (29) and the first switch (211). By repeatedly turning on and off the third switch (22), a voltage with higher level can be produced on the output capacitor (24) as the DC voltage (VB) and remains for a while until the energy in the energy-storage capacitor (27) is insufficient.

The first switch (121), second switch (122), third switch (22), charging switch (28) and the mode switch (29) can be, but not limited to, the metal oxide semiconductor field-effect transistors (MOSFETs), insulated gate bipolar transistors (IGBTs) or other power transistors.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An AC to DC power converter using an energy-storage capacitor for providing hold-up time function comprising:
    a full wave rectifier receiving AC power and rectifying the AC power to sine DC power;
    a power factor correction (PFC) circuit having an input terminal connected to the full wave rectifier and receiving the sine DC power and comprising an output capacitor;
    a PFC controller connected to the full wave rectifier and the PFC circuit to obtain a voltage signal and a voltage of the sine DC power, adjusting a voltage phase and a current phase of the sine DC power to be consistent with each other, and regulating the sine DC power to produce a DC voltage on the output capacitor;
    a switch type DC to DC converter connected to the output capacitor of the PFC circuit, and bucking the DC voltage to produce a low DC voltage;
    an energy-storage capacitor connected in parallel to the output capacitor through a charging switch, the charging switch being controlled by the PFC controller; and
    a mode switch connected between the energy-storage capacitor and the input terminal of the PFC circuit.

2. The AC to DC power converter as claimed in claim 1, wherein the PFC circuit further comprising:
    a switch unit connected to the full wave rectifier and comprising a first switch and a second switch being connected in series, the first switch and the second switch being controlled by the PFC controller;
    an inductor having a first terminal and a second terminal, the first terminal connected to a node where the first switch and the second switch are connected in series;
    a third switch connected between the second terminal of the inductor and a ground, and controlled by the PFC controller;
    a diode having an anode and a cathode, the anode connected to the second terminal of the inductor, the cathode connected to the output capacitor and the charging switch.

3. The AC to DC power converter as claimed in claim 2, wherein the first switch, the second switch, the third switch, the charging switch and the mode switch are field-effect transistors.

4. The AC to DC power converter as claimed in claim 2, wherein when the PFC controller obtains the voltage signal and the current signal of the sine DC power, the PFC controller further compares the voltage signal with a threshold value and is operated in
    a boost mode when the voltage signal is lower than the threshold value;
    a buck mode when the voltage signal is higher than the threshold value; or
    a hold-up time mode when the voltage signal is zero;
    wherein the PFC controller in the boost mode turns on the first switch and the charging switch, turns off the second switch and the mode switch, and adjusts a duty cycle of the third switch based on a difference between the voltage signal and the threshold value for regulating the voltage signal to be consistent with the threshold value;
    wherein the PFC controller in the buck mode turns on the charging switch, turns off the third switch and the mode switch, and selectively and alternately turns on and turns off the first switch or the second switch based on the difference between the voltage signal and the threshold value;
    wherein the PFC controller in the hold-up time mode turns on the first switch and the mode switch, turns off the second switch and the charging switch, and adjusts a duty cycle of the third switch until energy stored in the energy-storage capacitor is insufficient.

5. The AC to DC power converter as claimed in claim 1, wherein the first switch, the second switch, the third switch, the charging switch and the mode switch are field-effect transistors.

* * * * *